Figure 1:
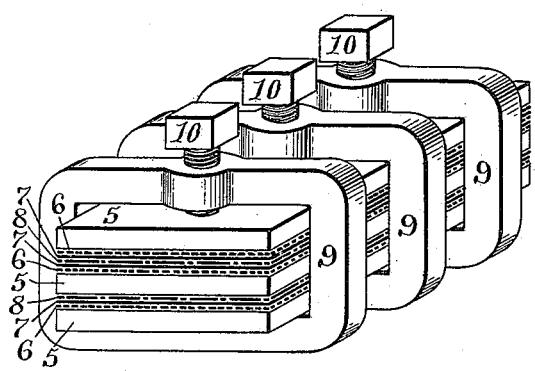

(No Model.)

G. U. MEYER.
PLATING METAL.

No. 440,847.  Patented Nov. 18, 1890.

WITNESSES:
Henry J. Miller
Henry A. McLean

INVENTOR:
George U. Meyer
By Joseph A. Miller & Co.
Attys

UNITED STATES PATENT OFFICE.

GEORGE U. MEYER, OF PROVIDENCE, RHODE ISLAND.

PLATING METAL.

SPECIFICATION forming part of Letters Patent No. 440,847, dated November 18, 1890.

Application filed September 9, 1890. Serial No. 364,464. (No specimens.)

*To all whom it may concern:*

Be it known that I, GEORGE U. MEYER, of Providence, in the county of Providence and State of Rhode Island, have invented a new and useful Improvement in Plating Metals; and I hereby declare that the following is a full, clear, and exact description of the same, reference being had to the accompanying drawings, forming part of this specification.

This invention has reference to an improved method for producing what is known in the art as "jewelers' stock-plate," consisting of a sheet of inferior metal plated with a film of precious metal; and the invention consists in the peculiar and novel manner of piling the plates, as will be more fully set forth hereinafter.

In the manufacture of jewelers' stock-plate a sheet of inferior metal having the surface cleaned and covered with flux is placed on a much thinner sheet of precious metal, also previously cleaned and prepared, and the two are placed between a pair of plating-irons the inner faces of which have been accurately ground to form two plane surfaces, between which the metal to be plated and the plating-sheet may be placed, and uniform pressure exerted by the clamps. The whole is secured together by the plating-clamps, and in this condition is placed into the furnace, where the whole is heated to a temperature sufficient to fuse the metals and to form a union of the plating-sheet with the plate of inferior metal. This is technically called the "sweating" process. The soldering process differs only from the sweating process in that one or the other of the surfaces to be united is covered by a metal fusible at a temperature lower than the precious or plating metal. In both instances the plating-irons are used to hold the sheets in contact, and must be subjected to the heat of the furnace in fusing either the metals or the intermediate soldering metal. The plating-irons are more or less injured at each heating, and must be ground or otherwise trued up before they can be used again; and, owing to the mass of material in the plating-irons, a long time is required to heat the whole to the fusing-point of the plating metal or the soldering metal. Such plating is always more or less imperfect, owing to the difficulty of securing absolutely uniform pressure over the surfaces to be united.

The object of this invention is to dispense with the use of the plating-irons, save the expense and time in grinding or surfacing the same, and also the time lost in heating the plating-irons; and to these purposes I so pile two or more plates of inferior metal and two or more plates of precious or other plating metal that the plates of inferior metal form the bottom and top layers of the pile, as will be more fully set forth hereinafter.

Figure 2:
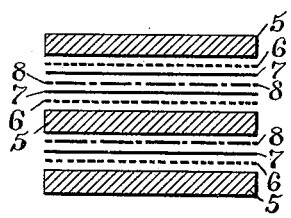

Figure 1 is a perspective view of a pile of stock prepared for the furnace to be heated. Fig. 2 is a sectional view of a pile of plates shown in the position they occupy before being clamped together and subjected to the fusing-heat of the furnace.

In the drawings I have shown the pile as it is prepared for the soldering process, in which a sheet of solder is placed between the plate of inferior metal and the plating metal. In the sweating process the solder is omitted.

In the drawings, the number 5 indicates the plate of inferior metal; 6, a sheet of solder; 7, the sheet of precious or other plating metal; 9, the clamps, and 10 the screws.

In preparing the pile after the surfaces of the metal to be united have been cleaned from all oxidations and impurities, the plate of inferior metal 5 is covered by the sheet of soldering metal 6, and on this is placed the sheet of plating metal 7. On the sheet of plating metal is now placed the sheet 8. This sheet may be a sheet of paper or other material that will not unite with the metal when heated. In practice I find that a sheet of iron, and particularly a sheet of smooth Russia sheet-iron, answers the purpose well. On the sheet 8 the plate 5 is placed, and the first pile, consisting of the plate 5, the sheet of solder 6, the sheet of plating metal 7, and the separating-sheet 8, is repeated, forming, when united by heat, two plates of plated metal—one on top of the other—separated by the seperating-sheet 8. Two, three, or more sets of sheets may thus be placed upon each other. On the upper sheet 8 the sequence is reversed—the plating-sheet 7 is placed on the sheet 8 and on the plating-sheet the sheet of soldering metal 6, and then on this the plate of inferior metal—so that the bottom and the top of the pile is formed by the plates 5. The so-formed pile is now placed into the clamps 9, and the screws 10 are turned to secure the sheets together. This so-prepared pile is now placed into the furnace and heated to fuse the soldering-metal sheet and unite the plating metal to the inferior plate.

When either the inferior plate 5 or the precious metal 7 have been covered with a soldering metal, then in forming the pile the sheets 6 are omitted; but otherwise the pile is formed in the same manner as is shown in the drawings; and when the sweating process is used the pile is successively formed, exactly as shown in the drawings, with the exception that the sheets 6 are omitted.

By my improved method more than twice the amount of plating is done with the same size of clamps in less time, for the heating of the plating-irons is saved, or the heat utilized to do useful work, instead of merely injuring the plating-irons, and the fusing is much more thorough. The result is much better than is the case when the rigid plating-irons are used, because the pile is more flexible and each clamp exerts a more direct pressure on all the plates, so that in practice I find much more perfect plating with this method than is produced with the use of plating-irons as heretofore.

Having thus described my invention, I claim as new and desire to secure by Letters Patent—

1. The herein-described method for plating metals, the same consisting in piling the plates of inferior metal and the plating-sheets so that the bottom and top of the pile consist of a plate of inferior metal, and a separating-sheet is placed between each set of plates and plating-sheets, securing the pile in the clamp, and subjecting the same to the action of heat, as described.

2. The method of clamping two or more plates and plating-sheets for fusing, consisting in piling the plates and sheets so that the thicker plates form the top and bottom, and securing the pile in clamps, the clamps acting directly on the plates without the intervention of plating-irons, as described.

GEORGE U. MEYER.

Witnesses:
J. A. MILLER, Jr.,
HENRY J. MILLER.